US012572393B2

(12) United States Patent
Anand et al.

(10) Patent No.: US 12,572,393 B2
(45) Date of Patent: Mar. 10, 2026

(54) CONTAINER CROSS-CLUSTER CAPACITY SCALING

(71) Applicant: INTERNATIONAL BUSINESS MACHINES CORPORATION, Armonk, NY (US)

(72) Inventors: Vishal Anand, Dublin (IE); Balachandar Rajaraman, Cary, NC (US); Christopher Hay, Great Horkesley (GB); Simon Greig, Guildford (GB); Utpal Mangla, Toronto (CA); Amit Deshpande, Pune (IN)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 18/052,993

(22) Filed: Nov. 7, 2022

(65) Prior Publication Data
US 2024/0152404 A1 May 9, 2024

(51) Int. Cl.
*G06F 9/50* (2006.01)
*G06F 9/48* (2006.01)
*G06F 9/54* (2006.01)

(52) U.S. Cl.
CPC .......... *G06F 9/5077* (2013.01); *G06F 9/4881* (2013.01); *G06F 9/541* (2013.01)

(58) Field of Classification Search
CPC ...... G06F 9/5077; G06F 9/541; G06F 9/4881; G06F 9/5088; G06F 2209/505
See application file for complete search history.

(56) References Cited

U.S. PATENT DOCUMENTS 8,701,112 B2 4/2014 Borghetti
9,405,781 B1 8/2016 Holt
(Continued)

FOREIGN PATENT DOCUMENTS

CN 110312987 A 10/2019
CN 110780998 A * 2/2020 ........... G06F 9/5016
(Continued)

OTHER PUBLICATIONS

Garrison, "Creating Kubernetes Auto Scaling Groups for Multiple Availability Zones," Amazon.com, Sep. 2, 2020, [accessed Oct. 17, 2022], 13 pgs., Retrieved from the Internet: <https://aws.amazon.com/blogs/containers/amazon-eks-cluster-multi-zone-auto-scaling-groups/>.
(Continued)

*Primary Examiner* — Charles E Anya
(74) *Attorney, Agent, or Firm* — Jeffrey M. Ingalls

(57) ABSTRACT
A method, computer program product, and computer system are provided for container cross-cluster capacity scaling. The method includes broadcasting local capacity information of capacity availability or capacity requirement for the local cluster and receiving broadcasts from each of one or more other clusters providing capacity information including capacity availability or capacity requirements. The method may map the received capacity information with the local capacity information and may determine a suitable cross-cluster capacity sharing when a capacity requirement of the local cluster maps to a capacity availability of another cluster or when a capacity availability of the local cluster maps to a capacity requirement of another cluster. The method may coordinate the deallocation of a node from the cluster having the capacity availability and reallocation of the node to the cluster having the capacity requirement.

16 Claims, 7 Drawing Sheets

(56) References Cited

U.S. PATENT DOCUMENTS

| | | | | |
|---|---|---|---|---|
| 9,830,192 | B1 * | 11/2017 | Crouchman | ....... G06Q 30/0601 |
| 10,140,154 | B2 | 11/2018 | Edwards | |
| 10,191,778 | B1 * | 1/2019 | Yang | ..................... G06F 11/301 |
| 10,447,806 | B1 | 10/2019 | Sahay | |
| 11,853,807 | B1 * | 12/2023 | Coult | ................... G06F 9/5077 |
| 2014/0047342 | A1 * | 2/2014 | Breternitz | ............ G06F 9/5061 |
| | | | | 715/735 |
| 2017/0063722 | A1 * | 3/2017 | Cropper | ............... G06F 16/285 |
| 2017/0373940 | A1 * | 12/2017 | Shahab | .................. H04L 47/70 |
| 2018/0159745 | A1 * | 6/2018 | Byers | ..................... G06F 9/455 |
| 2018/0246916 | A1 | 8/2018 | Fathalla | |
| 2018/0276044 | A1 | 9/2018 | Fong | |
| 2020/0042364 | A1 * | 2/2020 | Kumar Shimoga Manjunatha | ..... |
| | | | | G06F 9/5088 |
| 2021/0117244 | A1 * | 4/2021 | Herdrich | .............. G06F 9/5077 |
| 2021/0157655 | A1 * | 5/2021 | Foreman | .............. G06F 9/5088 |
| 2021/0208948 | A1 * | 7/2021 | Sagi | .................. G06Q 30/0609 |
| 2021/0342193 | A1 * | 11/2021 | Anand | ................. G06F 9/5077 |

FOREIGN PATENT DOCUMENTS

| | | | |
|---|---|---|---|
| CN | 107315636 B | 6/2020 | |
| CN | 111405055 A | 7/2020 | |
| CN | 112511611 A | 3/2021 | |
| CN | 112631612 A | 4/2021 | |
| CN | 113806066 A | 12/2021 | |
| CN | 113839974 A * | 12/2021 | ........... H04L 12/141 |
| CN | 109067828 B | 1/2022 | |
| WO | 2024/099246 A1 | 5/2024 | |

OTHER PUBLICATIONS

Kubernetes Blog, "Autoscaling in Kubernetes," Kubernetes.io, Jul. 12, 2016, [accessed Oct. 17, 2022], 5 pgs., Retrieved from the Internet: <https://kubernetes.io/blog/2016/07/autoscaling-in-kubernetes/>.

Kubernetes Blog, "Cross Cluster Services—Achieving Higher Availability for your Kubernetes Applications," Kubernetes.io, Jul. 14, 2016, [accessed Oct. 17, 2022], 5pgs., Retrieved from the Internet: <https://kubernetes.io/blog/2016/07/cross-cluster-services/>.

In, et al. "Dragon: A Dynamic Scheduling and Scaling Controller for Managing Distributed Deep Learning Jobs in Kubernetes Cluster," In Proceedings of the 9th International Conference on Cloud Computing and Services Science (CLOSER 2019), May 2-4, 2019, in Heraklion, Crete, Greece, SCITEPRESS, pp. 569-577, Retrieved from the Internet: <https://www.scitepress.org/ProceedingsDetails.aspx?ID=0QFfg8ujg%2fY%3d&t=1>.

Mell et al., "The NIST Definition of Cloud Computing", National Institute of Standards and Technology, Special Publication 800-145, Sep. 2011, pp. 1-7.

International Searching Authority, " Notification of Transmittal of the International Search Report and the Written Opinion of the International Searching Authority, or the Declaration", Applicant's File Feference:PF230602PCT, International Application No. PCT/CN2023/129843, International Filing Date: Nov. 6, 2023, Date of Mailing: Jan. 11, 2024, 8 pages.

* cited by examiner

100

180

200

300

CONTAINER CROSS-CLUSTER CAPACITY SCALING

BACKGROUND

The present disclosure relates to container cluster capacity scaling, and more specifically, to container cross-cluster capacity scaling.

Complex applications may be decomposed into many independent parts (referred to as "microservices") that cooperate via messaging, and the combined set of microservices represents a complete application. Containers are used for deploying microservices of applications in the cloud.

Containers offer significant advantages over previous technologies like Virtual Machines as they are more portable, quicker to start and stop, and integrate better with continuous integration and continuous delivery (CI/CD) systems. Multiple containers are run or "orchestrated" together, where each container runs a separate microservice and the combined set of microservices represents a complete application. For example, Kubernetes® (Kubernetes® is a trademark of The Linux Foundation) is an open-source container orchestration system for automating application deployment, scaling, and management.

SUMMARY

According to an aspect of the present disclosure there is provided a computer-implemented method for container cross-cluster capacity scaling, said method is carried at a local cluster having one or more current nodes in the form of physical or virtual machines running containers and comprises: broadcasting local capacity information of capacity availability or capacity requirement for the local cluster; receiving broadcasts from each of one or more other clusters providing capacity information including capacity availability or capacity requirement; mapping the received capacity information with the local capacity information; determining a suitable cross-cluster capacity sharing when a capacity requirement of the local cluster maps to a capacity availability of another cluster or when a capacity availability of the local cluster maps to a capacity requirement of another cluster; and coordinating the deallocation of a node from the cluster having the capacity availability and reallocation of the node to the cluster having the capacity requirement.

According to another aspect of the present disclosure there is provided a system for container cross-cluster capacity scaling, comprising: a processor and a memory configured to provide computer program instructions to the processor to execute the functions of the components of a cross-cluster capacity component including: a capacity broadcast component for broadcasting local capacity information of capacity availability or capacity requirement for the local cluster; a broadcast receiving component for receiving broadcasts from each of one or more other clusters providing capacity information including capacity availability or capacity requirements; a capacity mapping component for mapping the received capacity information with the local capacity information; and a capacity allocation component for determining a suitable cross-cluster capacity sharing when a capacity requirement of the local cluster maps to a capacity availability of another cluster or when a capacity availability of the local cluster maps to a capacity requirement of another cluster and coordinating the deallocation of a node from the cluster having the capacity availability and reallocation of the node to the cluster having the capacity requirement.

According to a further aspect of the present disclosure there is provided a computer program product for container cross-cluster capacity scaling, the computer program product comprising a computer readable storage medium having program instructions embodied therewith, the program instructions executable by a processor to cause the processor to: broadcast local capacity information of capacity availability or capacity requirement for the local cluster; receive broadcasts from each of one or more other clusters providing capacity information including capacity availability or capacity requirement; map the received capacity information with the local capacity information; determine a suitable cross-cluster capacity sharing when a capacity requirement of the local cluster maps to a capacity availability of another cluster or when a capacity availability of the local cluster maps to a capacity requirement of another cluster; and coordinate the deallocation of a node from the cluster having the capacity availability and allocating the node to the cluster having the capacity requirement.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present disclosure will now be described, by way of example only, with reference to the accompanying drawings.

Figure 1A:
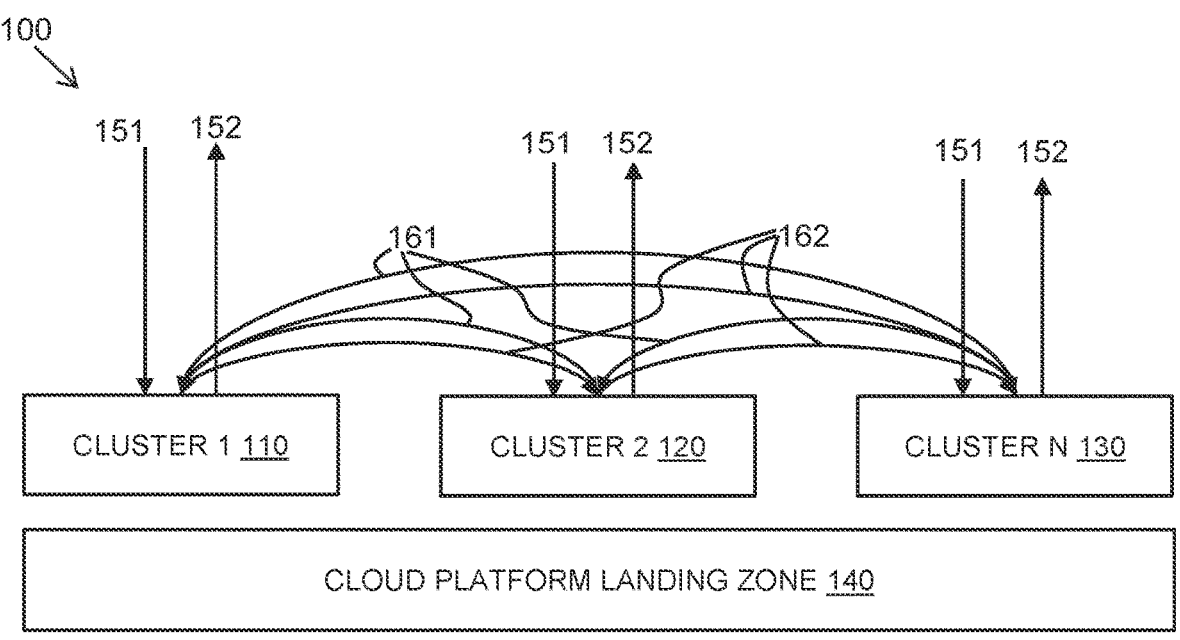
FIG. 1A and FIG. 1B are schematic diagrams illustrating example embodiments of cross-cluster scaling in accordance with one or more embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for container cluster capacity scaling including cross-cluster scaling of nodes. Clusters are provided in a container platform for containers managed by a container orchestration system. A workload is run on a container platform by placing containers into pods to run on nodes in clusters. A node may be a virtual or physical machine, depending on the cluster. Each node is managed by a control plane in the cluster and contains the services necessary to run the pods.

As previously described, complex applications may be decomposed into many independent parts (referred to as "microservices") that cooperate via messaging, and the combined set of microservices represents a complete application. Containers are used for deploying microservices of applications in the cloud. Containers offer significant advantages over previous technologies like Virtual Machines as they are more portable, quicker to start and stop, and integrate better with continuous integration and continuous delivery (CI/CD) systems. Multiple containers are run or "orchestrated" together, where each container runs a separate microservice and the combined set of microservices represents a complete application. For example, Kubernetes® is an open-source container orchestration system for automating application deployment, scaling, and management Container orchestration systems may take the form of cluster management systems which manage clustered groups of nodes in the form of physical or virtual machines running containers. Clusters may span nodes across public, private, and hybrid clouds. A container runs logically in a pod and a group of pods (related or unrelated) run on nodes in a cluster.

Container orchestration systems provide multiple layers of autoscaling functionality including a Horizontal Pod Autoscaler (HPA) and a Vertical Pod Autoscaler (VPA). The HPA scales the number of pods available in a cluster in response to the current computational needs and the VPA allocates more or less CPUs and memory to existing pods.

Another layer of autoscaling functionality is a Cluster Autoscaler (CA) for cluster autoscaling where worker pools can automatically increase or decrease the number of worker nodes in the pool based on the sizing needs of scheduled workloads. The cluster autoscaler periodically scans the cluster to adjust the number of worker nodes within the worker pools that it manages in response to workload resource requests and any custom settings that are configured, such as scanning intervals. Every minute, the cluster autoscaler checks for the situations to trigger scaling.

Cloud environments typically bill users according the resources consumed and, despite containers being less resource hungry, the cost of such "compute" capacity can still spiral if left unchecked.

In production at scale, organizations can deploy hundreds or thousands of clusters depending upon application and segregation requirements. Many of the clusters can be on a common cloud platform landing zone. However, compute capacity of one cluster is limited within its cluster boundaries with scale up and scale down being restricted within a cluster. Compute capacity in the form of CPU and memory requirements of pods through worker nodes that is provisioned in an orchestration system results in a waste of capacity and money when not in use In the described method and system, clusters broadcast their capacity requirements or availability to other clusters in the container platform and coordinate cross-cluster node deallocation and reallocation based on a mapping of node requirements and availability.

The cross-cluster capacity optimization is an improvement in the technical field of computer resource optimization.

Figure 1B:
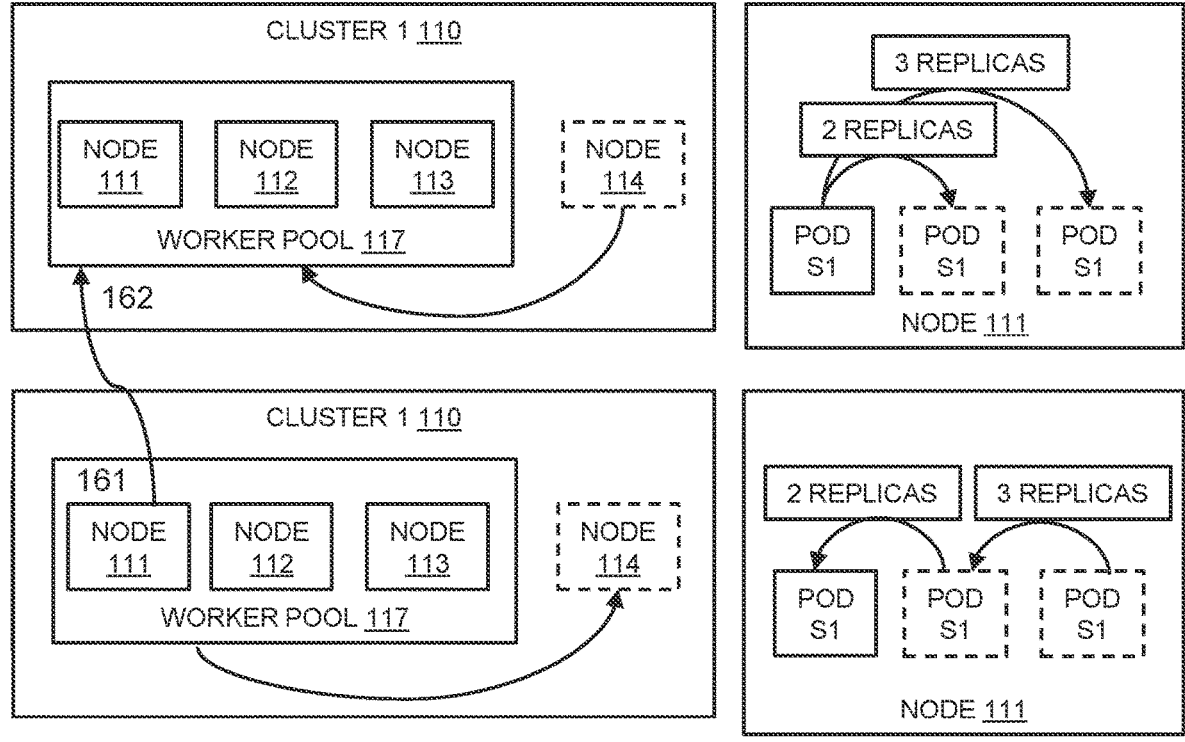

Referring to FIG. 1A, a schematic diagram 100 illustrates an example embodiment of multiple clusters 110, 120, 130. The clusters 110, 120, 130 may be single zone regions or multiple zone regions and these may be provided in a cloud platform landing zone 140. Each of the clusters 110, 120, 130 may have the ability to scale-up 151 and scale-down 152 its capacity in the cluster 110, 120, 130 by adding or removing nodes. FIG. 1B illustrates scaling-up 151 and scaling-down 152 of a cluster 110 by adding or removing a node 114 to or from a worker pool 117 of nodes 111-114. A node 111 may also scale-up or scale-down within the node by adding or removing pod replicas running a service.

The described method and system provide a mechanism by which cross-cluster capacity deallocation 161 and reallocation 162 are provided as illustrated in FIG. 1A and FIG. 1B. This optimizes capacity at any time in any cluster with significant cost reduction as capacity is moved between clusters. Each cluster 110, 120, 130 has its own data plane, i.e. set of compute nodes, and this data plane defines the boundary of the cluster 110, 120, 130. The described method and system can deallocate 161 and reallocate 162 capacity across data planes on a cloud platform. The described method and system may carry out the cross-cluster capacity sharing without impacting the billing of nodes.

Figure 1C:
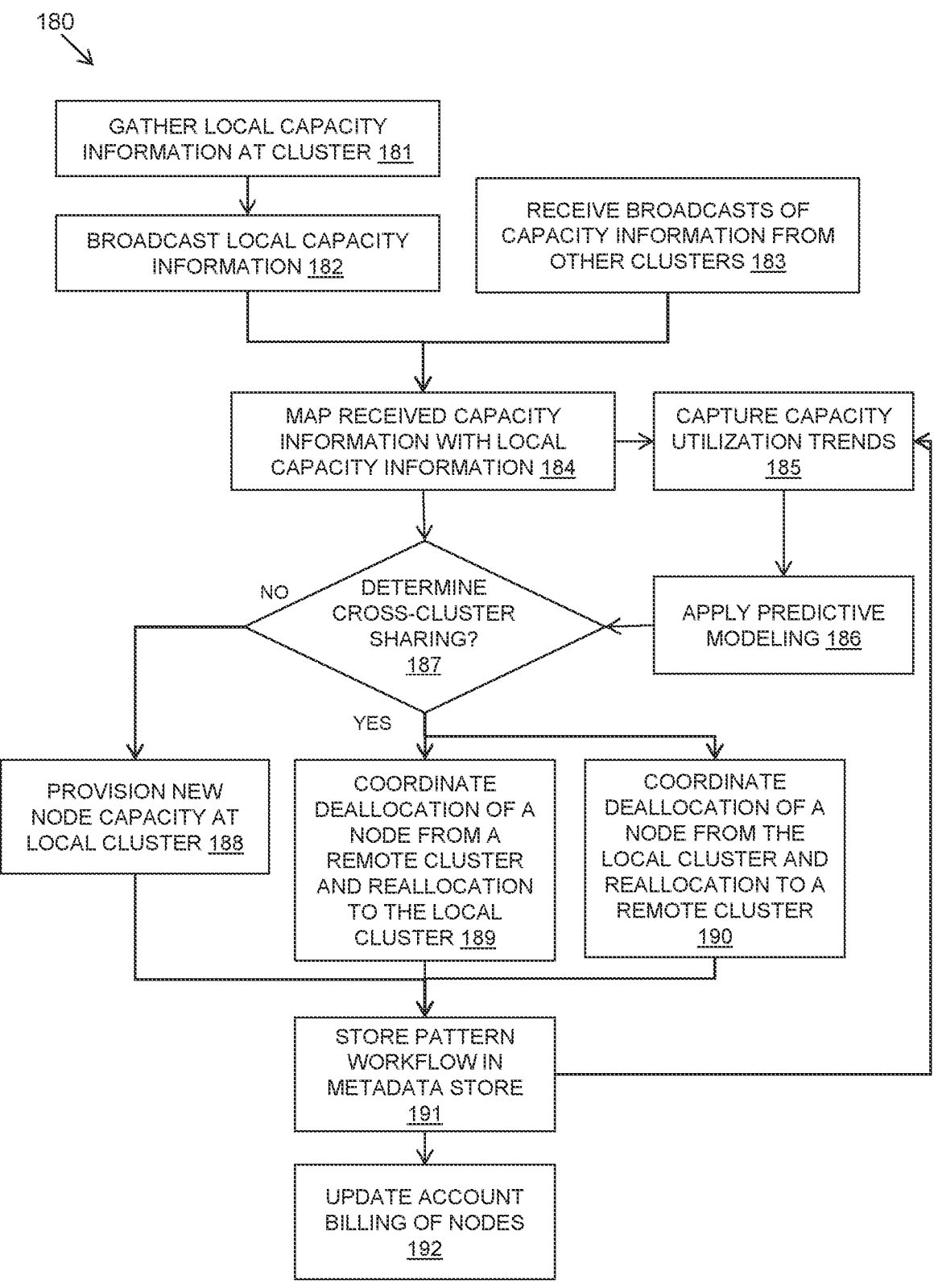
FIG. 1C is a flow diagram of an example embodiment of a method in accordance with embodiments.

Referring to FIG. 1C a flow diagram 180 shows an example embodiment of the described computer-implemented method for container cross-cluster capacity scaling. The method may be carried at a local cluster having one or more current nodes in the form of physical or virtual machines running containers.

The method may gather 181 local capacity information from agents running at each node at the local cluster. The method may broadcast 182 local capacity information of capacity availability or capacity requirement for the local cluster. The broadcast may be made at periodic intervals. Alternatively, the broadcast may be made when a threshold availability or capacity is reached.

The method may, simultaneously to broadcasting information, receive 183 broadcasts from each of one or more other clusters providing capacity information including capacity availability or capacity requirement.

The method may map 184 the received capacity information with the local capacity information. The local capacity information and the received capacity information may include temporary periods of availability or requirement of nodes and the mapping may be based on the temporary periods of availability and requirements. The capacity utilization trends may be captured 185 for the local cluster from the gathered capacity information.

The method may determine 187 a suitable cross-cluster capacity sharing when a capacity requirement of the local cluster maps to a capacity availability of another cluster or when a capacity availability of the local cluster maps to a capacity requirement of another cluster. This determination 187 may apply 186 predictive modeling based on the utilization trends. Determining 187 a suitable cross-cluster capacity sharing may include applying supply and demand algorithms used to understand the capacity availability and capacity requirements and using a rules-based scheduler to match the supply and demand algorithms.

When a capacity requirement of a local cluster is not met by received capacity availability of other clusters within a defined time frame, the method may provision 188 new node capacity to the local cluster by local cluster scaling.

When a capacity requirement of a local cluster is met by received capacity availability of other clusters within a defined time frame, the method may coordinate the sharing of capacity. The method may coordinate 189 the deallocation of a node from a remote cluster having the capacity availability and reallocation of the node to the local cluster having the capacity requirement. The method may alternatively coordinate 190 the deallocation of a node from the local cluster having the capacity availability and reallocation of the node to a remote cluster having the capacity requirement.

The method may store 191 metadata of workflow patterns for the local cluster and may capture 185 additional capacity utilization trends for the local cluster including the deallocation and reallocation trends.

The method may update 192 account billing and provide billing sharing beyond account boundaries when coordinating a node deallocation and reallocation.

Figure 2:
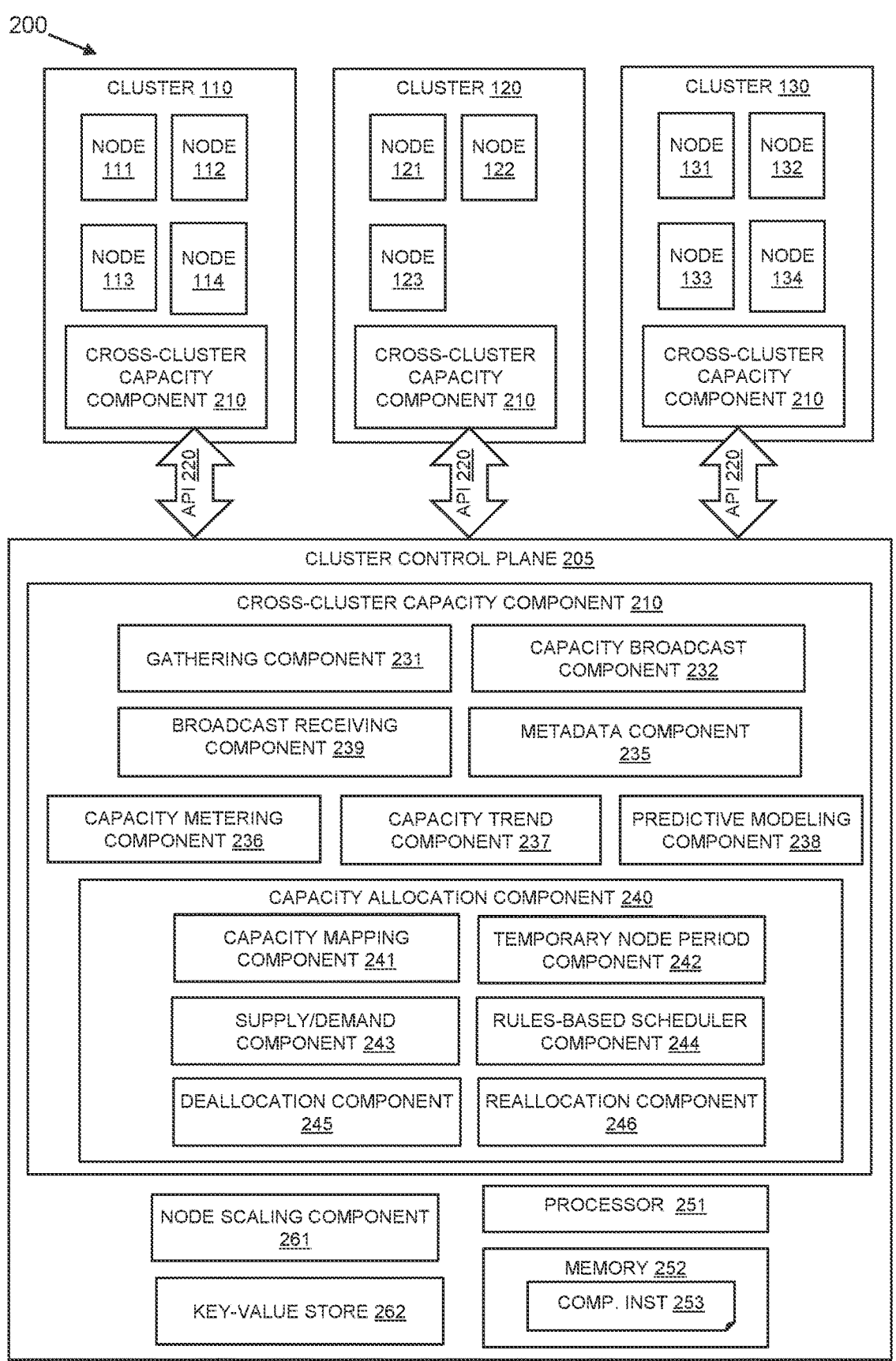
FIG. 2 is a block diagram of an example embodiment of a capacity optimization system in accordance with one or more embodiments.

Referring to FIG. 2, an example embodiment is shown of a capacity optimization system 200. Multiple clusters 110, 120, 130 may be provided with each of the clusters 110, 120, 130 having a number of current nodes 111-114, 121-123, 131-134. The described system includes a cross-cluster capacity component 210 in the form of a program running in a control plane 205 of each of the clusters 110, 120, 130.

The cross-cluster capacity component 210 provided on each cluster 110, 120, 130 includes an application programming interface (API) 220 for interfacing with cross-cluster capacity components 210 on other clusters 110, 120, 130. In FIG. 2, an example cross-cluster capacity component 210 is shown with components within it as an illustration of the cross-cluster capacity component 210 on each cluster 110, 120, 130.

A cross-cluster capacity component 210 in a cluster 110, 120, 130 receives capacity utilization information of each of the nodes 111-114 in its own cluster 110. For example, the capacity utilization information may be available node capacity and utilized node capacity. The capacity utilization information may be provided by an agent running on the nodes 111-114, 121-123, 131-134 and provided through an application programing interface.

The cross-cluster capacity component 210 of a cluster 110, 120, 130 aggregates the available capacity on the cluster level and broadcasts the capacity availability or requirement on the cluster level to other cross-cluster capacity components 210 in other clusters 110, 120, 130. As a result, the available capacity on the cluster level and the capacity requirement on the cluster level is published at a regular interval by each cluster 110, 120, 130. The broadcasting may take place at regular intervals and the frequency may be customized by an administrator.

The cross-cluster capacity components 210 provided on each cluster 110, 120, 130 may communicate with each other to perform an aggregation of the available capacity across clusters.

The cross-cluster capacity components 210 include the following components that communicate with each other and other components using container orchestration APIs. The functions of the cross-cluster capacity components 210 may be provided by defined custom resources and defined custom resource APIs in the container platform. The defined custom resource APIs on each cluster 110, 120, 130 communicate with similar peer defined custom resource APIs on other clusters 110, 120, 130.

The cross-cluster capacity components 210 include a gathering component 231 for gathering local capacity information from agents running at each node at the local cluster.

The cross-cluster capacity components 210 include a capacity broadcast component 232 for capacity availability broadcasts and capacity requirement broadcasts that broadcast cluster-level node capacity availability and cluster-level node capacity requirements respectively in a container-native manner. The cross-cluster capacity components 210 also include a broadcast receiving component 239 for receiving the broadcasts from cross-cluster capacity components 210 on other clusters.

Metadata in the form of the capacity information may be stored in a key-value data store 262 in the control plane 205 of each cluster by a metadata component 235 of the cross-cluster capacity component 210.

The cross-cluster capacity components 210 may include a capacity allocation component 240 for deallocating and reallocating nodes to and from the clusters 110, 120, 130 as determined for optimization of cross-cluster capacity. The capacity allocation component 240 may include a capacity mapping component 233 for mapping capacity availability and requirement requests.

The cross-cluster capacity components 210 may include a capacity trend component 237 and a predictive modeling component 238 for monitoring capacity trend and predictive modelling for the cluster.

The capacity allocation component 240 makes use of the information from other components to take smart decisions on capacity deallocation and reallocation. The capacity allocation component 240 may make use of inputs from the capacity availability broadcast component 231, the capacity requirement broadcast component 232, and the mapping component 241, and analysis from the capacity trend component 237, the predictive modeling component 238, and metadata of the metadata component 235 to take allocation decisions to match supply with demand.

The capacity allocation component 240 may include a temporary node period component 242, which takes into account a temporary period of availability of a node to other clusters. The temporary node period component 242 may, based on analysis from the capacity trend component 237 and the predictive modeling component 238, be informed that a node is only temporarily available to be used by other clusters which need additional capacity to support their intermittent workloads. After the temporary period is over, the first cluster may take back the node. This avoids scenarios such as cluster A having excess capacity that gets allocated to cluster B but shortly thereafter, cluster A starts looking for additional capacity due to increased load. The temporary node period component 242 enables intra-cluster temporary resource sharing. This is akin to cloud spot pricing models where workloads that can support intermittent execution can be scheduled on spare capacity on different clusters to reduce costs.

The capacity allocation component 240 may include a supply/demand component 243 for applying supply and demand algorithms that may be used to understand the availability of resources and their individual longevity before deprovisioning nodes to provide supply and to understand the resource requirements and other constraints required by the workload providing the demand. A rules-based scheduler component 244 may be provided to match the supply and the demand in the capacity allocation component 240.

The capacity allocation component 240 may include a deallocation component 245 for deallocating a node from the cluster on which the cross-cluster capacity component 210 is provided. The capacity allocation component 240 may include a reallocation component 246 for reallocating a node to the cluster on which the cross-cluster capacity component 210 is provided. The capacity allocation component 240 is responsible for assigning or removing nodes to and from the specific clusters to balance the capacity.

The cross-cluster capacity components 210 may include a capacity metering component 236 for cloud metering and billing with workflows of the capacity allocation component 240. The capacity metering component 236 is responsible for tracking the metering of each node by the cloud provider and transferring the accounting/billing of nodes to another cluster without provisioning a new node in the schema. Cloud providers are known to support mechanisms to access cross account resources. In the described system, clusters may reside in different cloud accounts. Different cloud accounts integrations may allow capacity utilization beyond individual account boundaries for bills sharing.

The components of a cluster control plane 205 including components of the cross-cluster capacity component 210 may be provided on one or more computing devices that include at least one processor 251, a hardware module, or a circuit for executing the functions of the described components which may be software units executing on the at least one processor. Multiple processors running parallel processing threads may be provided enabling parallel processing of some or all of the functions of the components. Memory 252 may be configured to provide computer instructions 253 to the at least one processor 251 to carry out the functionality of the components.

The cluster control plane 205 may include a node scaling component 261 for coordinating allocation of a node to the cluster by individual cluster scaling when a capacity requirement of a first cluster is not met by current capacity availability of other clusters within a defined time frame.

In one or more embodiments, the container orchestration system may be Kubernetes® and the container platform on which the described cross-cluster capacity component 210 is provided may be a Kubernetes®-based platform or may deploy Kubernetes®. The functions of the cross-cluster capacity components 210 of the clusters may be provided by Kubernetes® CustomResourceDefinition (CRD) APIs.

Figure 3:
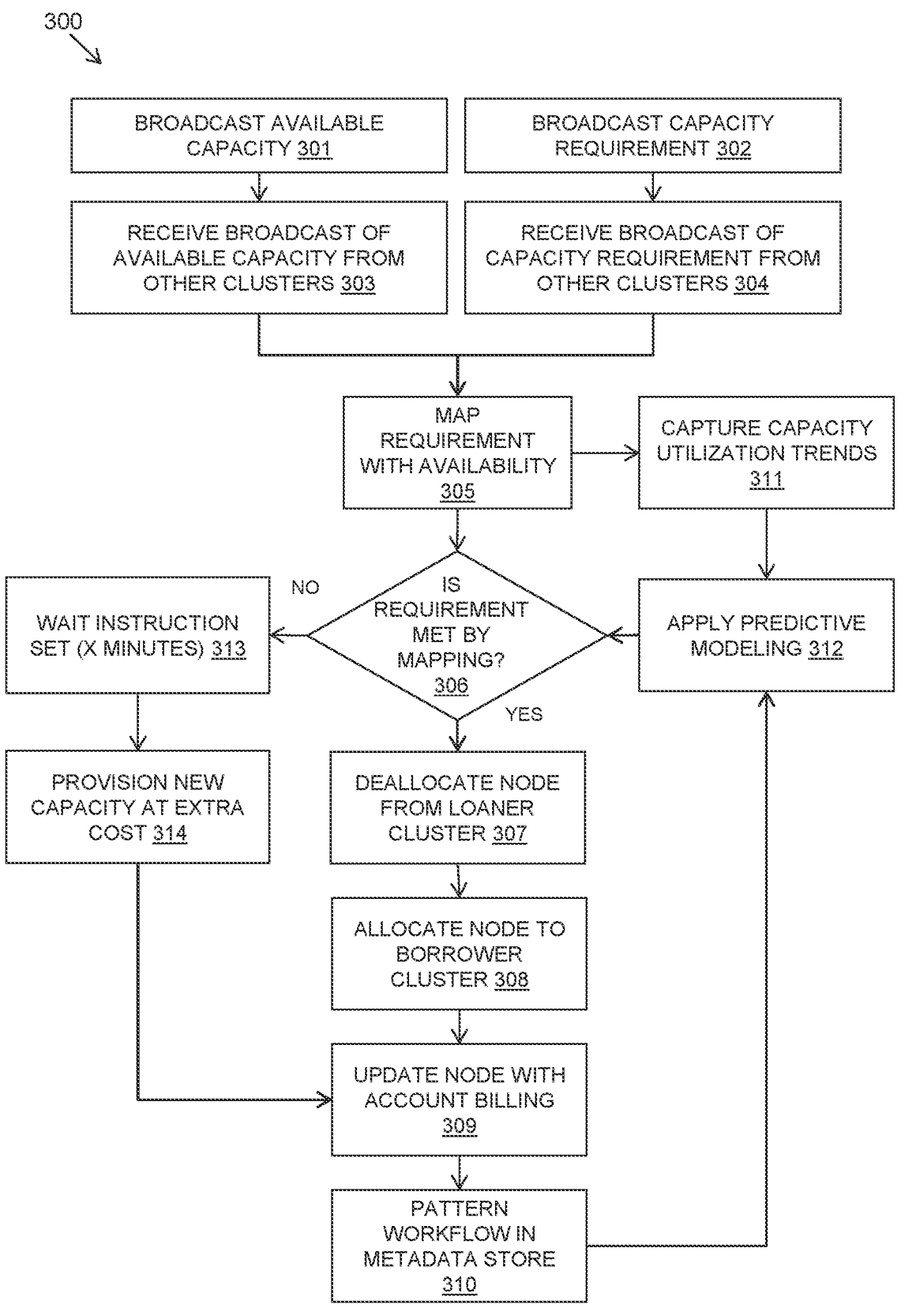
FIG. 3 is a flow diagrams of an example embodiment of a method in accordance with one or more embodiments.

Referring to FIG. 3, a flow diagram 300 shows an example embodiment of the described method as carried out at a cross-cluster capacity component 210 at each of a plurality of clusters, where each cluster has a scalable number of nodes in the form of physical or virtual machines running containers.

The method may broadcast 301, 302 available capacity required capacity for its own cluster on which the cross-cluster capacity component 210 operates. The method may receive capacity utilization by the nodes in this cluster through agents running on the nodes and may aggregate this to a cluster-level availability or requirement that is broadcast.

The method may receive 303, 304 broadcasts providing information on capacity availability or capacity requirements from other clusters relating to their nodes. The method may receive 303 a broadcast of available capacity from some clusters and the method may receive 304 a broadcast of required capacity from other clusters.

The broadcasts may be sent and received periodically. The broadcasts may include additional information such as a temporary period of availability or requirement of nodes in a cluster. The metadata of all the broadcast and received information may be stored in a key-value store in the control plane of each cluster.

The method maps 305 the received capacity availability and requirements of other clusters with the cluster's own availability and requirements as broadcast. This may take into account the temporary period of availability of nodes and temporary period of requirement of nodes. The method may capture 311 capacity utilization trends from the availability and requirements and may apply 312 these in predictive modelling of future capacity trends.

The method may determine 306 if a requirement is met by an availability to determine a cross-cluster capacity sharing. This may include applying 312 the predictive modeling of the requirements and availability as well as currently broadcast requirements and availability.

When a requirement is determined 306 to be met, the method may coordinate the deallocation 307 of a node from a loaner cluster and the reallocation 308 of the node to a borrower cluster. The method may update 309 the node with account billing to ensure that the billing for the node is passed to the borrower cluster. The method may store 310 a pattern of the workflow in a metadata store. The pattern of the workflow may be fed back to the predictive modeling 312.

When a requirement of the cluster is not met 306, the method may wait 313 an instruction set (x minutes) and may then coordinate the provision 314 of new capacity at extra cost for the cluster by allocating a new node. The newly provisioned node may be updated 309 with account billing and the method may store 310 the pattern of workflow provisioning a new node to the cluster.

The method may determine availability versus requirement of capacity. For example, a specific cluster (Cluster A) has extra capacity and at the same time another specific cluster (Cluster B) requires more capacity. In this scenario, the cross-cluster capacity component running on Cluster A deallocates node(s) from Cluster A and the cross-cluster capacity component running on Cluster B reallocates the same node (s) to Cluster B.

The metering and accounting information is transferred to Cluster B for the reallocated node. This works when cloud providers allow the metering and accounting of nodes to be transferred to another cluster. As a result, the accounting continues in a similar fashion as when the node was first created with another cluster. This allows the method to continue using the same metering and accounting and thus eliminates the need for new provisioning which triggers new accounting. This may be straightforward within one cloud provider's platform. However, if multiple cloud providers partner with each other to consider each other's metering and accounting, the method may work across cloud platforms.

Figure 4:
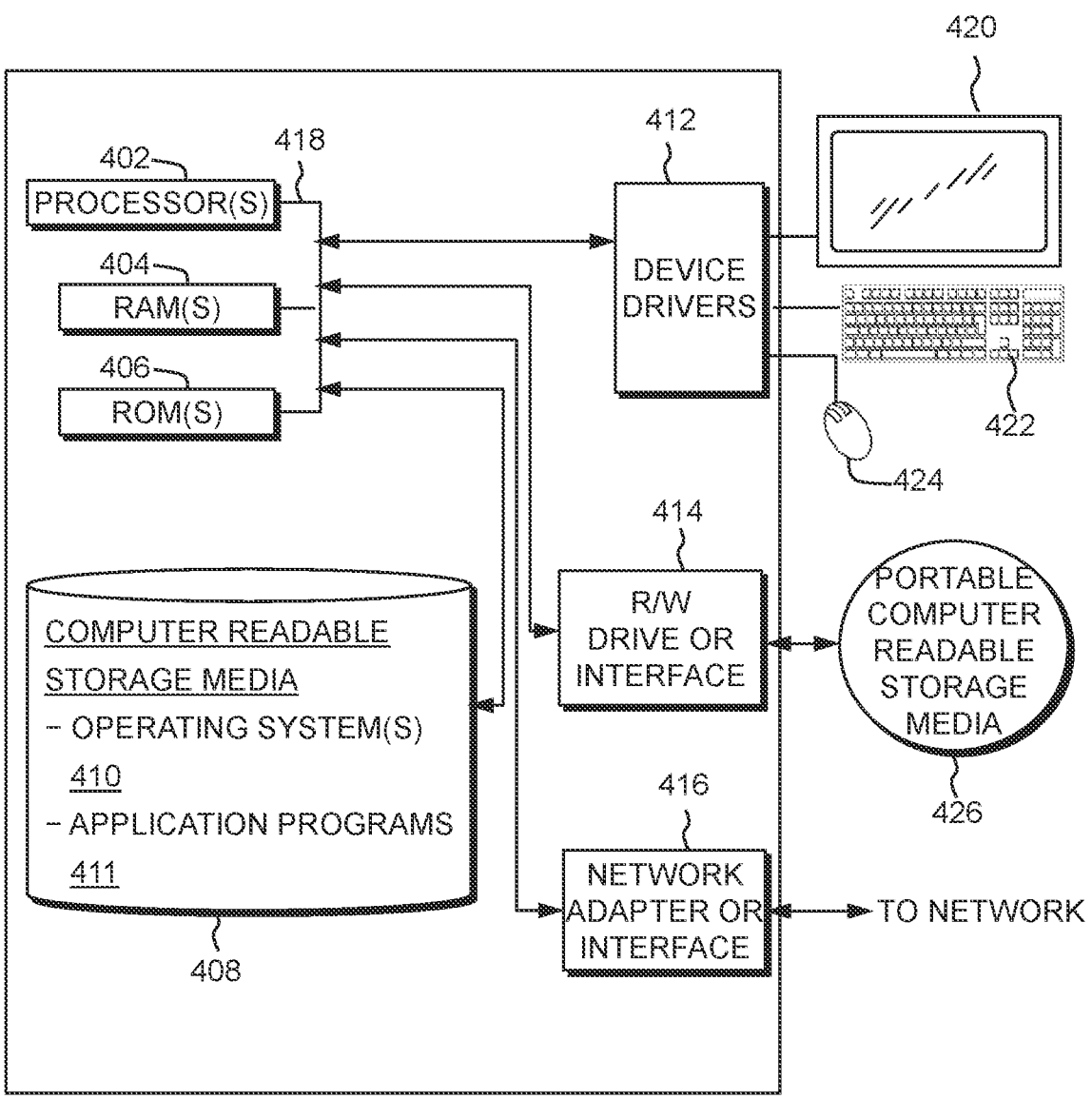
FIG. 4 is a block diagram of one or more embodiments of a computer system or cloud server in which one or more embodiments may be implemented.

FIG. 4 depicts a block diagram of components of a computing system as used in an orchestration system providing a capacity optimization system 200, in accordance with one or more embodiments. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with one or more embodiments.

The computing system can also include a R/W drive or interface 414 to read from and write to one or more portable computer readable storage media 426. Application programs 411 on the computing system can be stored on one or more of the portable computer readable storage media 426, read via the respective RAY drive or interface 414 and loaded into the respective computer readable storage media 408.

The computing system can also include a network adapter or interface 416, such as a TCP/IP adapter card or wireless communication adapter. Application programs 411 on the computing system can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, RAY drive or interface 414, and network adapter or interface 416 can comprise hardware and software stored in computer readable storage media 408 and/or ROM 406.

The embodiments disclosed herein may be a system, a method, and/or a computer program product at any possible technical detail level of integration. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments disclosed herein.

Aspects of the embodiments disclosed herein are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer imple- mented process, such that the instructions which execute on the computer, other programmable apparatus, or other device implement the functions/acts specified in the flow- chart and/or block diagram block or blocks.

The flowchart and block diagrams in the Figures illustrate the architecture, functionality, and operation of possible implementations of systems, methods, and computer pro- gram products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substan- tially concurrently, in a partially or wholly temporally over- lapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, imple- mentation of the teachings recited herein are not limited to a cloud computing environment. Rather, the embodiments disclosed herein are capable of being implemented in con- junction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilater- ally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynami- cally assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capa- bility at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, net- works, and other fundamental computing resources where the consumer is able to deploy and run arbitrary software, which can include operating systems and applications. The consumer does not manage or control the underlying cloud infrastructure but has control over operating systems, stor- age, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on- premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
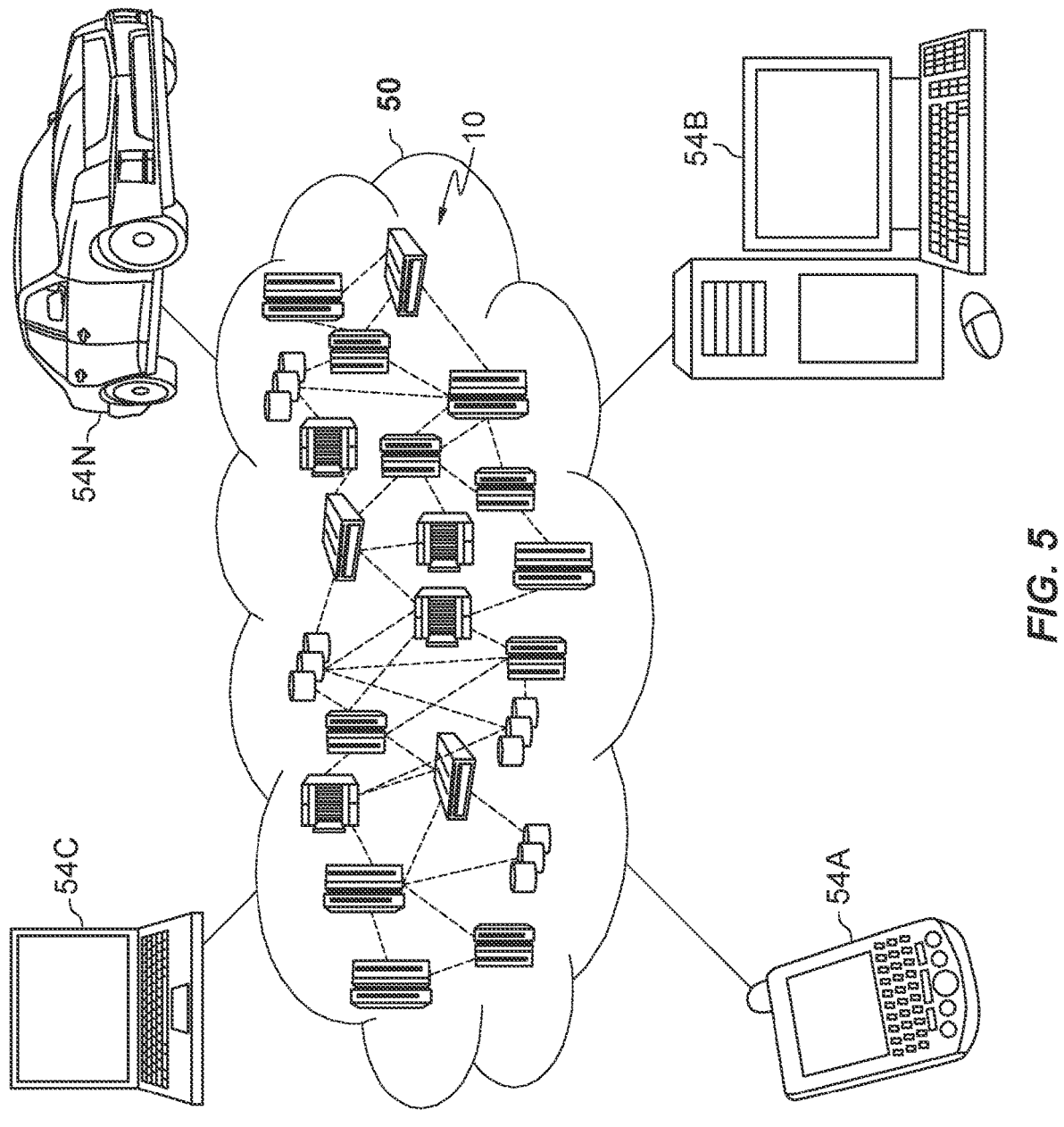
FIG. 5 is a schematic diagram of a cloud computing environment in which one or more embodiments may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
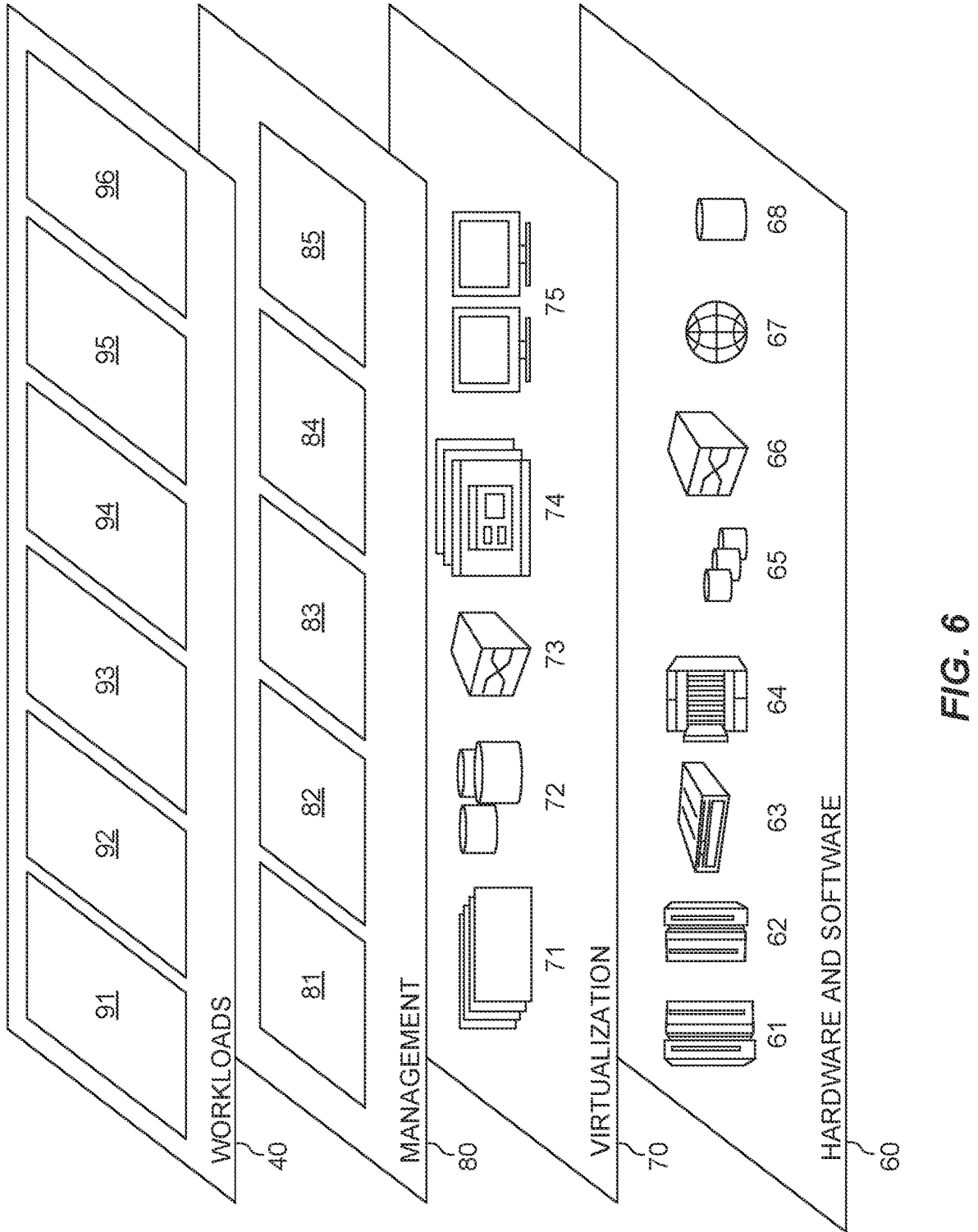
FIG. 6 is a diagram of abstraction model layers of a cloud computing environment in which one or more embodiments may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container cluster capacity optimization processing 96.

A computer program product comprises one or more computer readable hardware storage devices having computer readable program code stored therein, said program code executable by one or more processors to implement the methods disclosed herein.

A computer system comprises one or more processors, one or more memories, and one or more computer readable hardware storage devices, said one or more hardware storage device containing program code executable by the one or more processors via the one or more memories to implement the methods disclosed herein.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the disclosure.

What is claimed is:

1. A computer-implemented method for container cross-cluster capacity scaling, said method is carried at a local cluster having one or more current nodes in the form of physical or virtual machines running containers and comprises:

broadcasting local capacity information of capacity availability or capacity requirement for the local cluster;

receiving broadcasts from each of one or more other clusters providing capacity information including capacity availability or capacity requirement;

mapping the received capacity information with the local capacity information;

defining a time frame for determining if a suitable cross-cluster capacity sharing is possible;

storing metadata of workflow patterns in the form of the capacity information for the local cluster in a key-value data metadata store in a control plane of each of the local cluster and the other clusters, determining capacity utilization trends for the local cluster based on the metadata and the mapping; and applying predictive modeling based on the capacity utilization trends to the mapping, wherein on determining that a capacity requirement of the local cluster is not met by received capacity availability of the one or more other clusters within the defined time frame, coordinating allocation of a node to the local cluster by local cluster scaling, and wherein on determining that a capacity requirement of the local cluster maps to a capacity availability of a first cluster or that a capacity availability of the local cluster maps to a capacity requirement of a second cluster within the time defined time frame, coordinating deallocation of a node from the first cluster having the capacity availability and reallocation of the node to the second cluster having the capacity requirement.

2. The method of claim 1, wherein the local capacity information and the received capacity information include temporary periods of availability or requirement, and wherein the mapping is based on the temporary periods of availability and requirement.

3. The method of claim 1, wherein determining a suitable cross-cluster capacity sharing includes applying supply and demand algorithms used to understand the capacity availability and capacity requirements and using a rules-based scheduler to match the supply and demand algorithms.

4. The method of claim 1, including gathering local capacity information from an agent running at each node at the local cluster.

5. The method of claim 1, including updating account billing and providing billing sharing beyond account boundaries when coordinating a node deallocation and reallocation.

6. The method of claim 1, wherein the method is carried out in a control plane of a cluster including defined custom resource application programming interfaces (APIs) providing at least some of the method functions.

7. The method of claim 6, wherein the defined custom resource APIs on each cluster communicate with similar peer defined custom resource APIs on other clusters and the defined custom resource APIs communicate with each other and other components using container orchestration APIs.

8. A system for container cross-cluster capacity scaling, comprising:

a processor and a memory configured to provide computer program instructions to the processor to execute functions of components of a cross-cluster capacity component including:

a capacity broadcast component for broadcasting local capacity information of capacity availability or capacity requirement for a local cluster;

a broadcast receiving component for receiving broadcasts from each of one or more other clusters providing capacity information including capacity availability or capacity requirements;

a capacity mapping component for mapping the received capacity information with the local capacity information;

a defining component for defining a time frame for determining if a suitable cross-cluster capacity sharing is possible;

a metadata storing component for storing metadata of workflow patterns in the form of the capacity information for the local cluster in a key-value data metadata store in a control plane of each of the local cluster and the other clusters;

a capacity trend component for determining capacity utilization trends for the local cluster based on the metadata and the mapping; and a predictive modeling component for applying predictive modeling based on the capacity utilization trends to the mapping, wherein on determining, by a capacity allocation component, that a capacity requirement of the local cluster is not met by received capacity availability of the one or more other clusters within the defined time frame, coordinating allocation of a node to the local cluster by local cluster scaling, and

wherein on determining that a capacity requirement of the local cluster maps to a capacity availability of a first cluster or that a capacity availability of the local cluster maps to a capacity requirement of a second cluster within the time defined time frame, coordinating deallocation of a node from the first cluster having the capacity availability and reallocation of the node to the second cluster having the capacity requirement.

9. The system of claim 8, wherein the local capacity information and the received capacity information include temporary periods of availability or requirement, and wherein the capacity allocation component includes a temporary node period component for applying the temporary periods of availability and requirement.

10. The system of claim 8, including a supply/demand component for applying supply and demand algorithms used to understand the capacity availability and capacity requirements and a rules-based scheduler component for using a rules-based scheduler to match the supply and demand algorithms.

11. The system of claim 8, including a gathering component for gathering local capacity information from an agent running at each node at the local cluster.

12. The system of claim 8, including a capacity metering component for updating account billing and providing billing sharing beyond account boundaries when coordinating a node deallocation and reallocation.

13. The system of claim 8, wherein the capacity allocation component includes using a custom resource definition application programming interface (API) for deallocating nodes from a cluster and reallocating nodes to a cluster.

14. The system of claim 8, wherein the cross-cluster capacity component is configured in a control plane of a cluster including defined custom resource application programming interfaces (APIs) providing at least some of the method functions.

15. The system of claim 14, wherein the defined custom resource APIs on each cluster communicate with similar peer defined custom resource APIs on other clusters and the defined custom resource APIs communicate with each other and other components using container orchestration APIs.

16. A computer program product for container cross-cluster capacity scaling, the computer program product comprising a computer readable storage medium having program instructions embodied therewith, the program instructions executable by a processor to cause the processor to:

broadcast local capacity information of capacity availability or capacity requirement for the local cluster;

receive broadcasts from each of one or more other clusters providing capacity information including capacity availability or capacity requirement;

map the received capacity information with the local capacity information;

define a time frame for determining if a suitable cross-cluster capacity sharing is possible;

store metadata of workflow patterns in the form of the capacity information for the local cluster in a key-value data metadata store in a control plane of each of the local cluster and the other clusters;

determine capacity utilization trends for the local cluster based on the metadata and the mapping; and apply predictive modeling based on the capacity utilization trends to the mapping, wherein on determining that a capacity requirement of the local cluster is not met by received capacity availability of the one or more other clusters within the defined time frame, coordinating allocation of a node to the local cluster by local cluster scaling, and wherein on determining that a capacity requirement of the local cluster maps to a capacity availability of a first cluster or that a capacity availability of the local cluster maps to a capacity requirement of a second cluster within the time defined time frame, coordinating deallocation of a node from the first cluster having the capacity availability and reallocation of the node to the second cluster having the capacity requirement.

\* \* \* \* \*